Patented Mar. 4, 1924.

1,485,540

UNITED STATES PATENT OFFICE.

RICHARD WALTER, OF DUSSELDORF, GERMANY.

DESULPHURIZING MEDIUM AND PROCESS OF USING SAME.

No Drawing.  Application filed March 22, 1922. Serial No. 545,875.

*To all whom it may concern:*

Be it known that I, RICHARD WALTER, a citizen of the German Republic, and residing at Dusseldorf, Germany, have invented certain new and useful Improvements in Desulphurizing Mediums and Processes of Using Same, of which the following is a specification.

My invention relates to improvements in desulphurizing mediums and in the method of desulphurizing iron, and more particularly in the method in which alkaline earth compounds are applied to the molten metal. The object of the improvements is to provide a method by means of which the sulphur of the iron is to a large extent removed. With this object in view my invention consists in adding to the alkaline earth compound so much of an alkali compound that the amount of the alkali exceeds that of the alkaline earth, the alkali in the mixture being not less than 50 per cent.

I have found that in such a mixture the melting point is considerably reduced as compared to that of the alkaline earth compound, which is of the utmost importance in the desulphurizing process. By reason of the high melting point of the alkaline earths, such for example as the calcium oxid CaO, for example in the electric furnace the slag must be considerably superheated in order to cause a reaction of the alkaline earth and the sulphur of the iron. Therefore, the calcium oxid can not be used for desulphurizing iron which has already been tapped from the furnace and which is within a ladle, because it would not melt and therefore not in any way enter into reaction. If however an excess of an alkali is added to the alkaline earth such for example as the calcium oxid, the melting point of the mixture is reduced so far that molten pig iron is adapted to melt the same, and when further increasing the amount of alkali to 70 per cent or more the mixture is so fluent at the temperature of the molten pig iron, that the reaction with the sulphur of the iron and the formation of the sulfid are completed after a few minutes.

I have found that my improved process also the alkali added to the mixture takes part in the desulphurization by forming alkali sulphid.

The best result is obtained if only so much alkaline earth is contained in the mixture that the melting point of the mixture is not higher or not much higher than that of the alkali. In many cases, and more particularly when adding to the alkali mixtures of alkaline earths, such for example as dolomite, I add only so much of the mixture of the alkaline earths that the melting temperature of the mixture of the alkaline earths and the alkali is lower than that of the alkali. The proportions of the alkalis and alkaline earths which cause a reduction of the melting point are known to those skilled in the art and may be taken from the melting diagrams of the mixtures of alkaline earths and alkalis, and I prefer to select such proportions that a mixture of a minimum melting temperature is obtained. For example, when mixing 1 part of CaO and 9 parts of $Na_2CO_3$ the melting point of the mixture is lower than that of the $Na_2CO_3$, and it is rapidly increased when increasing the amount of CaO in the mixture. When using dolomite a similar result is obtained when adding 1 part of dolomite to 5 parts of $Na_2CO_3$.

It has heretofore been proposed to desulphurize iron baths by means of desulphurizing mediums in the presence of slag, such for example as high furnace or blast furnace slag or other slag containing silicate and coming from any other melting process. However, when using desulphurizing mediums, and more particularly alkalis or mixtures thereof with alkaline earths, it is a necessity at first to remove the slag formed by the melting process before adding the desulphurizing medium, because the said slag would reduce the action of the desulphurizing medium by diluting the same. Furthermore, when adding alkali to the slag, the formation of sulfid is made impossible and in some cases the iron is re-sulphurized by the sulphur of the slag.

This objectionable property of the slag resulting from the melting process is quite exceptional in the art, and it is distinguished from the property of the slag from the blast furnace which takes up sulphur during the melting process and may be regarded as a desulphurizing medium independently of the silicic acid contained therein. In the most unfavorable state it is saturated with sulphur; therefore, it would be natural to assume that when adding alkalis to the slag, the slag would take up sulphur from the iron. However, experiments have shown that this is not so, and that the presence of a slight amount of blast furnace slag is sufficient to cause re-sulphurization of the iron when adding alkali to the slag. Therefore, the presence of silicic acid or compounds thereof must be avoided in the process of desulphurizing iron by means of alkali compounds. Now, the slag produced in the process of melting iron contains more or less silicic acid compounds. Therefore, the desulphurizing process can be successful only, if the said slag is removed before desulphurization takes place:

Now, it is difficult completely to separate the slag from iron baths such for example as ladles, if the slag is very fluent, as for example in case of desulphurizing mediums having a high percentage of alkali. The slag tends to flow with the iron into the mould and to spoil the cast iron.

I have found that this objection is obviated by throwing pulverulent burnt lime on the surface of the iron and more particularly near the discharge thereof, where preferably a large amount of lime is used. The liquid slag is imbibed by the lime powder and it forms therewith a viscous slag which can more readily be removed, or which can be kept away from the mould by reason of its viscosity.

I have also found that not only powdered burnt lime is adapted to solidify the slag, but also calcium carbonate in the form of ground lime stone, chalk, marl, and slaked lime. The effect of these calcium compounds is increased because the heat required for decomposing the same causes a cooling of the slag.

I claim:

1. As a new composition of matter, the hereinbefore described desulphurizing medium, which consists of a mixture of alkali and alkali earth, the alkali being present in such an amount that the mixture will melt at a temperature approximating that at which the alkali per se will melt.

2. As a new composition of matter, the hereinbefore described desulphurizing medium, which consists of substantially one part of dolomite to five parts of $Na_2CO_3$.

3. As a new composition of matter, the hereinbefore described desulphurizing medium, which consists of a mixture of alkali and alkaline earth, in which mixture the proportional amount of alkali substantially exceeds that of the alkaline earth, and the melting temperature of which mixture is substantially that of the alkali as such.

4. The hereinbefore described process of desulphurizing ferrous baths, which consists in melting the charge and applying thereto a mixture of alkaline earth and alkali, the amount of the alkali exceeding that of the alkaline earth and the melting temperature of the mixture being approximately that of the alkali.

5. The hereinbefore described process of desulphurizing ferrous baths, which consists in applying to the melt a mixture comprising alkali and alkaline earth in which the alkali forms no less than 70% of the total.

6. The hereinbefore described process of desulphurizing iron, which consists in melting the charge, removing therefrom the slag, and applying to the melt a mixture containing alkaline earth and alkali, the amount of the alkali exceeding that of the alkaline earth and the melting temperature of the mixture being substantially that of the alkali.

In testimony whereof I affix my signature in presence of two witnesses.

RICHARD WALTER.

Witnesses:
 HENRY W. HAAS,
 WILLIAM E. LANE.